United States Patent [19]

Sawada et al.

[11] Patent Number: 4,667,764
[45] Date of Patent: May 26, 1987

[54] RESILIENT MOUNTING DEVICE FOR TRANSVERSELY DISPOSED ENGINE OF FRONT-ENGINE FRONT-DRIVE VEHICLE

[75] Inventors: Koji Sawada, Toyota; Makoto Suzuki, Komaki, both of Japan

[73] Assignees: Tokai Rubber Industries, Ltd.; Toyota Jidosha Kabushiki Kaisha, both of Japan

[21] Appl. No.: 746,296

[22] Filed: Jun. 19, 1985

[30] Foreign Application Priority Data

Jun. 22, 1984 [JP] Japan .............................. 59-94133[U]

[51] Int. Cl.$^4$ .............................................. B60K 5/04
[52] U.S. Cl. .................................... 180/297; 180/300; 180/312; 267/141
[58] Field of Search ....................... 180/297, 300, 312; 267/63 R, 141, 153

[56] References Cited

FOREIGN PATENT DOCUMENTS

| | | | |
|---|---|---|---|
| 0143830 | 11/1981 | Japan | 267/141 |
| 0191129 | 11/1982 | Japan | 180/300 |
| 0063520 | 4/1983 | Japan | 180/297 |
| 0202110 | 11/1983 | Japan | 180/297 |

Primary Examiner—John J. Love
Assistant Examiner—Richard Camby
Attorney, Agent, or Firm—Parkhurst & Oliff

[57] ABSTRACT

A mounting device for resiliently supporting a transverse engine on a frame in a vehicle which includes a cylindrical resilient mount having an inner sleeve, an outer sleeve disposed around and spaced apart from the inner sleeve so as to form a radial space therebetween, and a resilient member disposed in the radial space and having a first and a second void which are formed on diametrically opposite sides of the inner sleeve such that the voids are located opposite to each other in a first direction diametrically in the resilient mount. The device further includes a linking structure for connecting the resilient mount to the vehicle engine and frame, such that the axis of the resilient mount is parallel to an axis of rolling of the engine which extends transversely in the vehicle. The linking structure holds the resilient mount such that the first direction of the first and second voids coincides with a second direction in which the resilient mount is vibrated upon rolling of the engine about the rolling axis. The resilient member is subject primarily to a compressive stress upon application of a vibrational load in the vertical direction of the vehicle, and subjected primarily to a shearing stress upon application of a vibrational load in the second direction.

8 Claims, 6 Drawing Figures

RESILIENT MOUNTING DEVICE FOR TRANSVERSELY DISPOSED ENGINE OF FRONT-ENGINE FRONT-DRIVE VEHICLE

BACKGROUND OF THE INVENTION

1. Field of the Art

The present invention relates in general to a mounting device for resiliently supporting an engine on a frame of a front-engine front-drive automotive vehicle such that the engine is disposed transversely in the vehicle. More particularly, the invention is concerned with a resilient mounting structure for such a transverse engine, including a cylindrical resilient bushing or mount which comprises an inner sleeve, an outer sleeve and a resilient member connecting the inner and outer sleeves. The resilient mount is disposed parallel to an axis of rolling of the transverse engine which extends transversely in the vehicle.

2. Related Art Statement

For resiliently mounting such a transversely oriented engine of a front-engine front-drive car, an engine mounting device is known, which is disposed in parallel with an axis of rolling of the engine which extends across the length of the car. Such an engine mounting device uses a cylindrical resilient bushing or mount which comprises an inner sleeve, an outer sleeve disposed around the inner sleeve in a radially-spaced apart and parallel relationship with each other so as to form a radial space therebetween, and a resilient member disposed in the radial space to resiliently connect the inner and outer sleeves. The inner sleeve is connected to one of the engine and the car frame via a shaft inserted therein, while the outer sleeve is connected at its outer periphery to the other of the engine and the frame. The resilient member interposed between the inner and outer sleeves includes two voids or cavities which are formed on diametrically opposite sides of the inner sleeve.

In the known engine mounting device of the type described above, the resilient mount is disposed between the car frame and the engine such that the two voids formed in the resilient member are opposite to each other in the vertical direction of the car. That is, the direction in which the two voids are opposite to each other diametrically in the cylindrical resilient mount is held upright, with one of the voids being located right above the inner sleeve. In this arrangement, the resilient member is subjected primarily to a shearing stress when a vibrational load is applied to the resilient mount in the vertical direction. On the other hand, the resilient member is subject to a considerable degree of compressive stress in addition to the shearing stress, when a vibrational load is applied in the direction of rolling of the engine. Accordingly, the resilient member has a low spring rate or low spring constant in the vertical direction of the car, but has a comparatively high spring constant in the rolling direction. These spring characteristics of the conventional engine mounting device are not favorable for supporting a transversely oriented engine of a front-engine front-drive car.

Described more particularly, the comparatively low spring constant of the resilient member in the vertical direction may allow the engine to vibrate due to vibrations of unsprung members of the car caused by bumpy road surfaces, namely, may easily cause a phenomenon of engine "shake". In the meantime, the comparatively high spring constant in the rolling direction may lead to easy transfer of idling or other vibrations of the engine about its torque axis to the car frame.

SUMMARY OF THE INVENTION

It is therefore a principal object of the present invention to provide a resilient mounting device for a transversely oriented engine of a front-engine front-drive vehicle, which alleviates the conventionally experienced inconveniences of engine shake and low isolation from idling vibrations of the engine.

According to the present invention, there is provided a mounting device disposed between an engine and a frame of a front-engine front-drive vehicle, for resiliently supporting the engine on the frame such that the engine is disposed transversely of the vehicle, comprising: (a) a cylindrical resilient mount including an inner sleeve, an outer sleeve disposed around said inner sleeve in a radially-spaced apart and parallel relationship with each other so as to form a radial space therebetween, and a resilient member disposed in the radial space to resiliently connect the inner and outer sleeves, the resilient member having a first void and a second void which are formed on diametrically opposite sides of the inner sleeve such that the first and second voids are located opposite to each other in a first direction diametrically in the resilient mount; and (b) linking means for connecting the inner sleeve to one of the engine and the frame of the vehicle, and for connecting the outer sleeve to the other of the engine and the frame, such that an axis of the resilient mount is parallel to an axis of rolling of the engine which extends transversely in the vehicle, the linking means holding the resilient mount such that the first direction of the first and second voids coincides with a second direction in which the resilient mount is vibrated upon rolling of the engine about the axis of rolling thereof, the first and second voids being formed and located such that the resilient member is subject primarily to a compressive stress upon application of a vibrational load in the vertical direction of the vehicle, and subject primarily to a shearing stress upon application of a vibrational load in the first and second directions.

In the mounting device of the invention constructed as described above, the resilient member exhibits relatively hard spring characteristics to the vibrational load applied in the vertical direction of the vehicle, thereby effectively minimizing a phenomenon of engine shake which would otherwise be caused by vibrations of the unsprung members of the vehicle. On the other hand, the resilient member exhibits relatively soft spring characteristics to the vibrational load applied in the direction of rolling of the engine, thus effectively minimizing the transfer of idling vibrations of the engine to the vehicle frame.

According to an advantageous embodiment of the invention, the resilient member is pre-compressed between the inner and outer sleeve, by shrink drawing on the outer sleeve prior to the attachment of the resilient mount to the linking means, such that one of the first and second voids formed in the resilient member disappears at least partially in volume under a non-load condition of the resilient mount.

In accordance with another advantageous embodiment of the invention, the resilient member comprises a radially inner portion surrounding the entire circumference of the inner sleeve, and a radially outer stopper portion contacting an inner surface of the outer sleeve.

The radially inner portion has an arcuate convex surface which partially defines one of the first and second voids and which has an arc of a circle substantially concentric with the inner sleeve. The radially outer stopper portion has an arcuate concave surface which cooperates with the arcuate convex surface of the radially inner portion to define an arcuate space of the aforementioned one of the first and second voids. The arcuate convex surface of the radially inner portion is abuttable against the arcuate concave surface of the stopper portion, with the arcuate space disappearing, upon application of a vibrational load to the resilient mount. The resilient member may be pre-compressed between the inner and outer sleeves, such that the arcuate space of the above-indicated one void disappears under a non-load condition of the resilient mount.

BRIEF DESCRIPTION OF THE DRAWING

These and other objects and many of the attendant advantages of the invention will be readily appreciated and become better understood by reference to the following detailed description of a preferred embodiment of the invention, when considered in connection with the accompanying drawings, in which.

DETAILED DESCRIPTION OF THE PREFERRED EMBODIMENT

To further clarify the concept of the present invention, a preferred embodiment of the invention will be described in detail by reference to the accompanying drawings.

Figure 1:
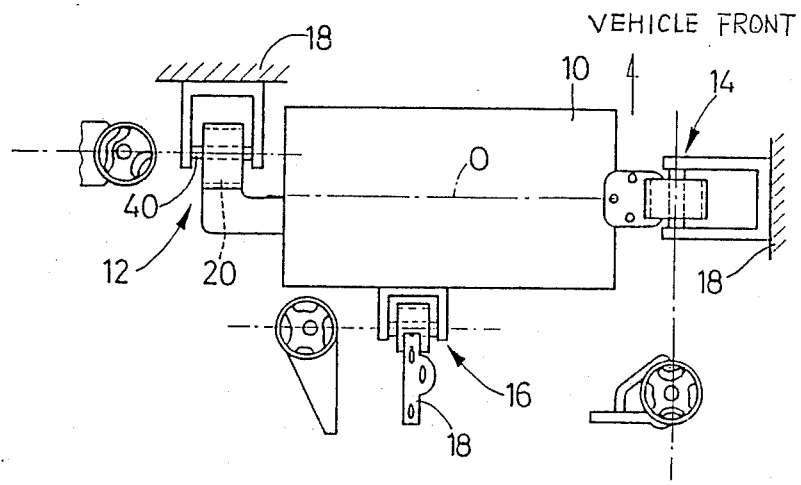
FIG. 1 is a schematic plan view of a supporting structure for a transversely oriented engine in a vehicle, which includes a mounting device embodying the present invention.

There is first shown in the schematic plan view of FIG. 1, an engine 10 of an automotive vehicle of a front-engine front-drive-type, wherein the engine 10 is oriented transversely in the vehicle. Although only the transversely oriented engine 10 is shown in the interest of brevity and simplification, the engine 10 is usually a part of a power unit which also includes a transmission, a differential and other components. The transverse engine 10 is supported resiliently on a frame 18 of the vehicle via three resilient mounting devices 12, 14 and 16. The resilient mounting devices 12 and 14 are located on left and right sides of the engine 10, while the third resilient mounting device 16 is located on the rear side of the engine 10. Of the three resilient mounting devices 12, 14, 16, the left resilient mounting device 12 is constructed according to the invention. The resilient mounting device 12 comprises a cylindrical resilient bushing or mount 20 which is disposed so that its axis is parallel to a rolling axis "O" (torque axis) of the transverse engine 10, which extends transversely in the vehicle, i.e., perpendicular to the direction of length of the vehicle. Details of the resilient mounting device 12 are illustrated in enlarged views in FIGS. 2 and 3.

As is understood from these figures, the cylindrical resilient mount 20 includes an inner metal sleeve 22, an outer metal sleeve 24, and a resilient rubber member 26 which connects the inner and outer metal sleeves 22 and 24. The outer metal sleeve 24 is disposed around and radially spaced apart from the inner metal sleeve 22 in a parallel relationship with each other, so as to form a radial space therebetween. The inner and outer metal sleeves 22 and 24 are substantially concentric with each other, so that the radial space defined therebetween is annular. The rubber member 26 is accommodated in this substantially annular radial space, and is formed with a first void 28 and a second void 30. The first and second voids 28, 30 are formed on diametrically opposite sides of the inner metal sleeve 22 such that these voids 28, 30 are located opposite to each other in a first direction "A" (FIG. 2) diametrically of the inner and outer metal sleeves 22, 24 (diametrical direction of the cylindrical resilient mount 20). As shown in FIG. 3, these voids 28, 30 extend along the axis of the inner metal sleeve 22.

The rubber member 26 comprises a first radially outer stopper portion 32 which contacts the inner surface of the outer sleeve 24. The first stopper portion 32 partially defines the first void 28. The rubber member 26 further comprises a second radially outer stopper portion 34 which is located opposite to the first stopper portion 32 diametrically of the inner and outer metal sleeves 22, 24. The second stopper portion 34 is also held in contact with the inner surface of the outer metal sleeve 24, and partially defines the second void 30.

The rubber member 26 further comprises a radially inner portion 36 which surrounds the entire circumference of the inner metal sleeve 22. The radially inner portion 36 has an arcuate convex surface 37 in the form of an arc of a circle substantially concentric with and relative to the outer periphery of the inner metal sleeve 22. Also, the first radially outer stopper portion 32 has an arcuate concave surface 38 relative to the arcuate convex surface 37, which cooperates with the arcuate convex surface 37 of the radially inner portion 36 to define an arcuate part 39 of the first void 28. The arcuate convex and concave surfaces 37 and 38 are abuttable against each other, upon relative displacement of the radially inner portion 36 and the first stopper portion 32 in the direction A. Obviously, the arcuate part 39 of the first void 28 disappears when the opposed arcuate convex and concave surfaces 37, 38 abut against each other. Thus, the inner and outer sleeves 22, 24 are resiliently connected to each other by the rubber member 26 which has the first and second voids 28, 30.

Figure 4:
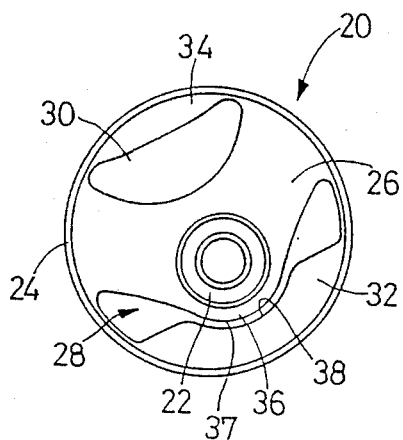
FIG. 4 is an elevational view of a cylindrical resilient mount of the mounting device, before a resilient member of the mount is pre-compressed.
Figure 5:
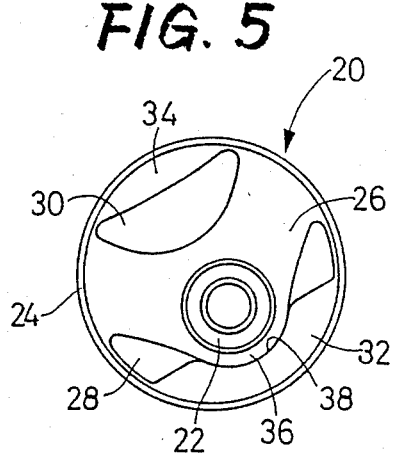
FIG. 5 is an elevational view of the cylindrical resilient mount after the resilient member is pre-compressed.

In fabricating the cylindrical resilient mount 20, the inner and outer metal sleeves 22, 24 are disposed in a suitable mold, such that the inner and outer metal sleeves 22, 24 are disposed parallel with each other, to a predetermined radial distance therebetween. In this condition, a fluidized rubber material is poured into the mold, and the poured rubber material is vulcanized to form the rubber member 26 with the first and second stopper portions 32, 34. Thus, the inner and outer metal sleeves 22, 24 are welded to the rubber member 26 through vulcanization of the rubber material, whereby the resilient mount 20, as shown in FIG. 4, is prepared. The prepared resilient mount 20 is then subjected to a commonly practiced shrink drawing or reducing operation by means of a drawing die or dies. As a result, the radially inner portion 36 surrounding the inner metal sleeve 22 is pre-compressed in such direction and to such extent that the arcuate part 39 of the first void 28 disappears, with the opposed arcuate convex and concave surfaces 37, 38 of the portions 36, 32 abutting against each other, as depicted in FIG. 5. This pre-compression increases the durability of the rubber member 26 at its peripheral portions adhering to the inner surfaces of the outer metal sleeve 24 and at its other portions.

Figure 2:
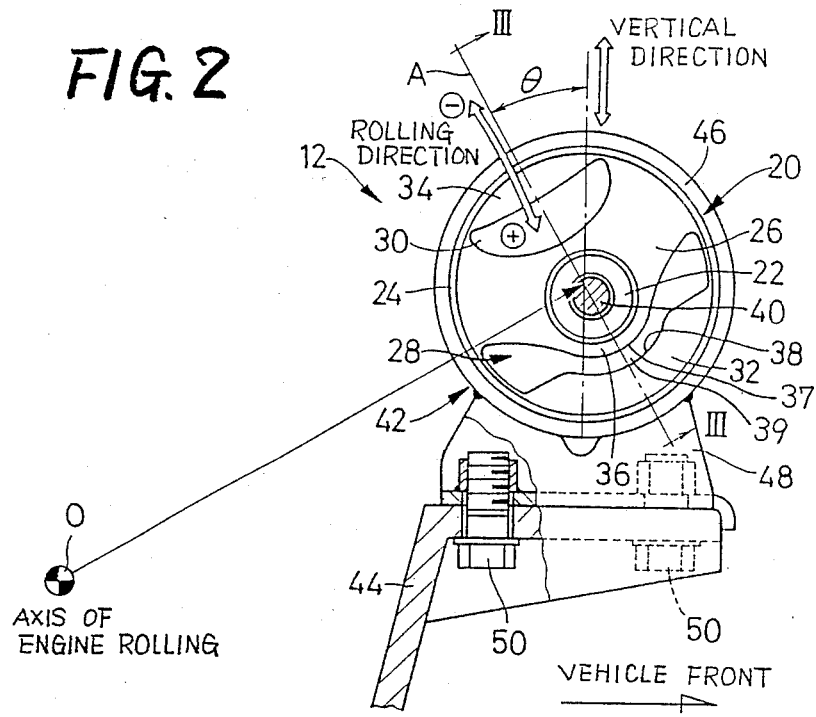
FIG. 2 is an enlarged, partially-cutaway elevational view of the mounting device of FIG. 1.
Figure 3:
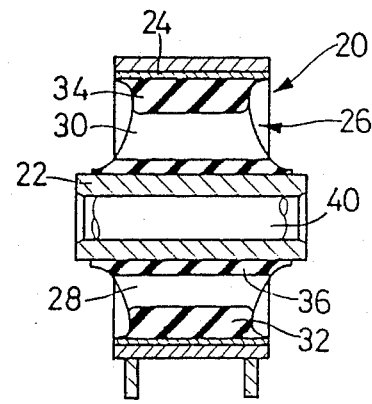
FIG. 3 is a cross sectional view taken along the line III—III of FIG. 2.

As is apparent from FIGS. 1 and 2, the thus prepared and processed resilient mount 20 is connected at its inner metal sleeve 22 to the frame 18, and at its outer metal sleeve 24 to the engine 10, such that the axis of the resilient mount 20 is parallel to the rolling axis "O" of the engine 10. Stated in more detail, the mounting device 12 includes linking means which comprises a shaft 40 supported by the frame 18, a retainer bracket 42, and an engine bracket 44 fixed to the engine 10. The shaft 40 is inserted through the bore of the inner metal sleeve 22. The retainer bracket 42 has a cylinder portion 46, and an integral seat portion 48 which is secured to the engine bracket 44 by bolts 50. The outer metal sleeve 24 is tightly held in the cylinder portion 46 of the retainer bracket 42, as with a press-fit or other suitable method.

In the cylindrical resilient mount 20, which is disposed between the engine 10 and the frame 18, as described above, to support the static load of the engine 10, the inner metal sleeve 22 is almost co-axial with the outer metal sleeve 24 to which the static load of the engine 10 is exerted. In other words, the axis of the inner metal sleeve 22 is only slightly offset from the axis of the outer metal sleeve 24, toward the first stopper portion 32 in the first direction "A" in which the first and second voids 28, 30 are opposite to each other diametrically of the cylindrical mount 20.

The resilient mount 20, which is held in the cylinder portion 46 of the retainer bracket 42, is symmetrical with respect to a straight line "A" which passes through the axis of the inner metal sleeve 22 and which is parallel to the first direction "A". This straight line "A" is inclined at an angle $\theta$ from the vertical (vertical direction of the vehicle). Namely, the resilient mount 20 is oriented circumferentially relative to the cylinder portion 46 of the retainer bracket 42, so that the first direction "A" of the first and second voids 28, 30 substantially coincides with a second direction (referred to as "rolling direction" where appropriate) in which the resilient mount 20 is vibrated upon rolling of the engine 10 about the previously indicated rolling axis "O". Stated differently, the first and second directions "A" are inclined or rotated by an angle $\theta$ from the vertical. With the resilient mount 20 thus oriented circumferentially relative to the retainer bracket 42, the rubber member 26 (particularly, its upper right portion as seen in FIG. 2) is subjected primarily to a compressive stress upon application of a vibrational load in the vertical direction. When a vibrational load is applied to the resilient mount 20 in the first (second) direction "A" (rolling direction), however, the rubber member 26 is subjected primarily to a shearing stress.

In the mounting device 12, constructed as described hitherto, the rubber member 26 of the resilient mount 20 exhibits relatively hard spring characteristics involving a compressive deformation (deflection or strain) thereof, upon application of vibrational loads in the vertical direction, while it exhibits relatively soft spring characteristics primarily involving a shearing deformation (deflection or strain), upon application of vibrational loads in the direction of rolling of the engine 10, i.e., in the rolling direction "A" of FIG. 2. According to an experiment conducted on the instant mounting device 12 using the rubber member 26 made of a rubber material which is generally used for vibration damping or shock absorbing applications, the following result was obtained, where the angle $\theta$ was 30°:

Kz = 17.2 Kg/mm

Kr = 8.9 Kg/mm where,
Kz: spring constant of the rubber member 26 in the vertical direction
Kr: spring constant of the rubber member 26 in the rolling direction "A"

The above result indicates a relatively high spring constant or rate for the vibrations in the vertical direction, which is effective to restrain the phenomenon of engine "shake". Stated more particularly, the rigidity of the support structure of the engine in the vertical direction is improved, with a result of restraining the engine "shake", which is a phenomenon of the engine vibration or oscillation due to the vibrations of unsprung members of the vehicle caused by eccentricity of tires of the vehicle, bumpy road surfaces, etc. Hence, the relatively hard spring characteristics in the vertical direction contributes to minimization of the engine "shake" which causes the vehicle frame to vibrate.

As previously indicated, the transverse engine of a vehicle of front-engine front-drive-type undergoes high-frequency idling vibrations about its rolling axis "O" due to variations in the torque while the engine is idling. In the instant mounting device 12, however, the rubber member 26 undergoes primarily a shearing stress when the resilient mount 20 is vibrated upon rolling of the engine 10, and thus provides a relatively low spring constant to the rolling vibrations of the engine during its idling. Accordingly, the idling vibrations peculiar to the transversely oriented engine 10 of the front-drive front engine vehicle are effectively absorbed by the rubber member 26, whereby the isolation of the vehicle frame 18 from the idling vibrations of the engine is enhanced.

Because the spring constant of the rubber member 26 in the engine-rolling direction "A" is low, the relative displacement between the inner and outer metal sleeves 22, 24 is large, while the engine 10 undergoes idling vibrations. However, the rubber member 26 is protected against separation from the inner and outer metal sleeves 22, 24. Namely, the radially inner portion 36 which surrounds the entire circumference of the inner metal sleeve 22 assures firm connection between the rubber member 26 and the inner metal sleeve 22. Further, the adhesion of the rubber member 26 to the inner surface of the outer metal sleeve 24 is boosted by the pre-compression of the rubber member 26 against the inner surface of the outer metal sleeve 24 by means of shrink drawing or any other suitable method for reducing the diameter of the outer metal sleeve 24. Consequently, the durability of the rubber member 26 is improved and the possibility of separation of the rubber member 26 from the surfaces of the sleeves 22, 24 is minimized, in spite of comparatively large displacements of the inner and outer metal sleeves 22, 24 relative to each other.

As is recognized in the art, the transverse engine 10 of a front-engine front-drive vehicle inherently suffers a rearward rolling action or backward inclination about its rolling axis "O" by reaction of the drive torque when the engine 10 is started or rapidly accelerated. Since the inner metal sleeve 22 through which the shaft 40 is inserted is fixed to the frame 18, the outer metal sleeve 24 is forced, by reaction of the rolling action of the engine, to move toward the negative or minus (−) side in the rolling direction "A" (FIG. 2), whereby the first stopper portion 32 is moved toward the radially inner portion 36 around the inner metal sleeve 22. The movement of the outer metal sleeve 24 is finally blocked by way of abutment of the arcuate concave surface 38 of the stopper portion 32 against the opposite arcuate convex surface 37 of the radially inner portion 36 adjacent to the periphery of the inner metal sleeve 22. Thus, a further movement of the outer metal sleeve 24 relative to the inner metal sleeve 22 is prevented.

Figure 6:
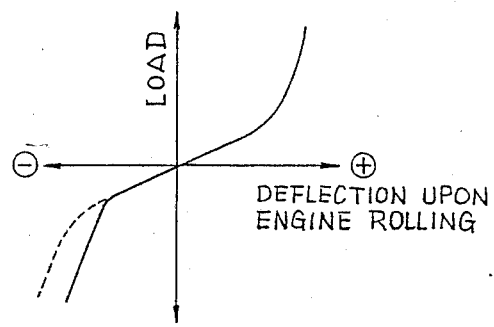
FIG. 6 is a graphical representation illustrating spring characteristics of the mounting device upon application of a vibrational load to the resilient mount in the rolling direction of the engine.

In addition, the previously described pre-compression of the rubber member 26 gives the rubber member 26 different spring rate characteristics to the rolling movements of the engine in the positive (+) and negative (−) directions, as indicated by the load-deflection curves in FIG. 6. More specifically, when a load is applied in the negative (−) direction, the deflection of the rubber member 26 is restricted at an earlier time than when a load is applied in the positive (+) direction. If the rubber member 26 was not pre-compressed, the load-deflection curve for the load in the negative (−) direction would be almost the same as that for the load in the positive (+) direction, as indicated by the broken line in FIG. 6. However, in the instant resilient mount 20 wherein the rubber member 26 is pre-compressed, the amount of deflection of the rubber member 26 for abutment of the first stopper portion 32 against the radially inner portion 36 upon application of a load in the negative (−) direction, is smaller than that which is necessary for abutment of the second stopper portion 34 against the radially inner portion 36 upon application of a load in the positive (+) direction. Hence, the rearward rolling action or backward inclination of the engine 10 upon its start or acceleration may be stopped at a relatively early time or in a relatively short period of time, through abutment of the first stopper portion 32 against the radially inner portion 36. Further, this stopping abutment takes place over a relatively large area, i.e., between the arcuate concave surface 38 of the first stopper portion 32, and the arcuate convex surface 37 of the radially inner portion 36. This relatively large contact surface area permits a secure stop of the rearward rolling action of the engine 10.

The first stopper portion 32 also functions to prevent an excessive relative displacement of the inner and outer metal sleeves 22, 24 in the vertical direction, as well as in the rolling direction "A". As previously described, the arcuate concave surface 38 of the first stopper portion 32 and the arcuate convex surface 37 of the radially inner portion 36 cooperate to define the arcuate part 39 of the first void 28. With this configuration, the relative displacements of the inner and outer metal sleeves 22, 24 not only in the vertical direction but also in the rolling direction, can be blocked by the surfaces 37, 38 substantially perpendicular to the direction of the relative displacement. Therefore, the first stopper portion 32 and the radially inner portion 36 provide substantially the same stopping or blocking capability in both the vertical and the rolling directions, even with the circumferential positioning of the resilient mount 20 such that its first direction ("A") is rotated from the vertical.

While the cylindrical resilient mount 20 of the illustrated mounting device 12 is attached to the frame 18 at its inner metal sleeve 22, and to the engine 10 at its outer metal sleeve 24, it is possible that the outer metal sleeve 24 can be connected to the frame 18, while the inner metal sleeve 22 can be connected to the engine 10. In this case, it is desired that the resilient mount 20 be rotated 180° from the position of FIG. 2, so that the positions of the first and second voids 28, 30 are reversed in order to obtain substantially the same result as in the illustrated embodiment.

While the present invention has been described in its preferred embodiment, it is to be understood that the invention is not confined to the precise disclosure contained herein, but may be otherwise embodied with various changes, modifications and improvements which may occur to those skilled in the art, without departing from the scope of the invention defined in the appended claims.

What is claimed is:

1. A mounting device disposed between an engine and a frame of a front-engine front-drive vehicle, for resiliently supporting a static load of the engine on the frame such that the engine is disposed transversely in the vehicle, comprising:

a cylindrical resilient mount including an inner sleeve, an outer sleeve disposed around said inner sleeve in a radially-spaced apart relationship and in a parallel relationship with each other, such that a radial space is formed therebetween, and a resilient member disposed in said radial space to resiliently connect said inner and outer sleeves, said resilient member including a first void and a second void which are formed on diametrically opposite sides of said inner sleeve such that said first and second voids are located opposite to each other in a first direction diametrically on the resilient mount; and linking means for connecting said inner sleeve to one of said engine and said frame of the vehicle, and for connecting said outer sleeve to the other of the engine and the frame, such that an axis of said resilient mount is parallel to an axis of rolling of said engine which extends transversely across the vehicle, said linking means holding said resilient mount such that said first direction of the first and second voids coincides with a second direction in which said resilient mount is vibrated upon rolling of said engine about said axis of rolling thereof, wherein a symmetrical axis which is perpendicular to said axis of the resilient mount symmetrically disects each of said first and second voids and is positioned on angle θ from a vertical direction in the vehicle such that said resilient member is subjected primarily to a compressive stress upon application of a vibrational load in the vertical direction of the vehicle, and subjected primarily to a shearing stress upon application of a vibrational load in said first and second directions.

2. A mounting device according to claim 1, wherein said resilient member is pre-compressed between said inner and outer sleeves, by shrink drawing on said outer sleeve prior to attachment of said resilient mount to said linking means, such that at least one of said first and second voids disappears partially in volume under a non-load condition on the resilient mount.

3. A mounting device according to claim 1, wherein said resilient member comprises a radially inner portion surrounding an entire circumference of said inner sleeve, said radially inner portion including an arcuate convex surface which protrudes toward an inner surface of said outer sleeve and which has an arc of a circle substantially concentric with said inner sleeve, and which partially defines one of said first and second voids, said resilient member further comprising a radially outer stopper portion contacting the inner surface of said outer sleeve, said stopper portion including an arcuate concave surface which is complementary to said arcuate convex surface thereby defining an arcuate space in said one of the first and second voids, said arcuate convex surface of said radially inner portion being abuttable against said arcuate concave surface of said stopper portion, with said arcuate space disappearing, upon application of a vibrational load to said resilient mount.

4. A mounting device according to claim 3, wherein said resilient member is pre-compressed between said inner and outer sleeve, by shrink drawing on said outer sleeve prior to attachment of said resilient mount to said linking means, such that said arcuate space disappears under a non-load condition on the resilient mount.

5. A mounting device according to claim 3, wherein said resilient member further comprises another radially outer stopper portion contacting the inner surface of said outer sleeve, said another stopper portion including a surface which partially defines the other of said first and second voids, and which is abuttable against a surface of said radially inner portion.

6. A mounting device disposed between an engine and a frame of a front-engine front-drive vehicle, for resiliently supporting the engine on the frame such that the engine is disposed transversely in the vehicle, comprising:

a cylindrical resilient mount including an inner sleeve, an outer sleeve disposed around said inner sleeve in a radially-spaced apart relationship and in a parallel relationship with each other, such that a radial space is formed therebetween, and a resilient member disposed in said radial space to resiliently connect said inner and outer sleeves, said resilient member including a first void and a second void which are formed on diametrically opposite sides of said inner sleeve such that said first and second voids are located opposite to each other in a first direction diametrically on the resilient mount, said resilient member further including a radially inner portion surrounding an entire circumference of said inner sleeve, said radially inner portion including an arcuate convex surface which protrudes toward an inner surface of said outer sleeve and which has an arc of a circle substantially concentric with said inner sleeve and which partially defines one of said first and second voids, said resilient member also including a radially outer stopper portion contacting the inner surface of said outer sleeve, said stopper portion including an arcuate concave surface which is complementary to said arcuate convex surface, thereby defining an arcuate space in said one of the first and second voids; and linking means for connecting said inner sleeve to one of said engine and said frame of the vehicle, and for connecting said outer sleeve to the other of the engine and the frame, such that an axis of said resilient mount is parallel to an axis of rolling of said engine which extends transversely across the vehicle, said linking means holding said resilient mount such that said first direction of the first and second voids coincides with a second direction in which said resilient mount is vibrated, upon rolling of said engine about said axis of rolling thereof;

said first and second voids being formed and located such that said resilient member is subjected primarily to a compressive stress upon application of a vibrational load in the vertical direction of the vehicle, and subjected primarily to a shearing stress upon application of a vibrational load in said first and second directions, said arcuate convex surface of said radially inner portion being abuttable against said arcuate concave surface of said stopper portion, with said arcuate space disappearing, upon application of a vibrational load to said resilient mount.

7. A mounting device according to claim 6, wherein said resilient member is pre-compressed between said inner and outer sleeve, by shrink drawing on said outer sleeve prior to attachment of said resilient mount to said linking means, such that said arcuate space disappears under a non-load condition on the resilient mount.

8. A mounting device according to claim 6, wherein said resilient member further comprises another radially outer stopper portion contacting the inner surface of said outer sleeve, said another stopper portion including a surface which partially defines the other of said first and second voids, and which is abuttable against a surface of said radially inner portion.

* * * * *